(12) United States Patent
Piccoz et al.

(10) Patent No.: US 9,455,562 B2
(45) Date of Patent: Sep. 27, 2016

(54) ELECTRICAL APPARATUS HAVING A GAS INSULATION CONTAINING A FLUORINATED COMPOUND

(75) Inventors: Daniel Piccoz, Lucenay (FR); Romain Maladen, Macon (FR)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 253 days.

(21) Appl. No.: 14/118,421

(22) PCT Filed: Apr. 27, 2012

(86) PCT No.: PCT/FR2012/000167
§ 371 (c)(1),
(2), (4) Date: Nov. 18, 2013

(87) PCT Pub. No.: WO2012/160266
PCT Pub. Date: Nov. 29, 2012

(65) Prior Publication Data
US 2014/0083737 A1 Mar. 27, 2014

(30) Foreign Application Priority Data
May 24, 2011 (FR) .................... 11 54509

(51) Int. Cl.
*H02G 7/05* (2006.01)
*H02B 13/055* (2006.01)
*H01H 33/56* (2006.01)

(52) U.S. Cl.
CPC .............. *H02G 7/05* (2013.01); *H02B 13/055* (2013.01); *H01H 2033/566* (2013.01)

(58) Field of Classification Search
CPC .................. H02B 13/055; H02G 7/05

USPC ............................................ 174/11 R, 17 GF
See application file for complete search history.

(56) References Cited

U.S. PATENT DOCUMENTS 3,150,245 A * 9/1964 Baker .................... H01H 33/22
218/112
3,356,810 A * 12/1967 Kessler ................ H01H 33/562
174/17 GF (Continued)

FOREIGN PATENT DOCUMENTS

DE 20 2009 018 239 7/2011
EP 0 131 922 1/1985

(Continued)

OTHER PUBLICATIONS

French Search Report Issued Jan. 10, 2012 in Application No. FR1154509 Filed May 24, 2011.

(Continued)

*Primary Examiner* — William H Mayo, III
*Assistant Examiner* — Hiram E Gonzalez
(74) *Attorney, Agent, or Firm* — Oblon, McClelland, Maier & Neustadt, L.L.P.

(57) ABSTRACT

An electrical apparatus for a medium- to high-voltage current transport line having a gas insulation including: a sealed housing filled with an electrically insulating gas including at least one fluorinated compound such as a fluoroketone, at least one electrical component arranged inside the inner space of the housing, and a mechanism regulating an amount of the fluorinated compound inside the inner space of the housing. The regulating mechanism includes a heater, heating a liquid resulting from condensation of the fluorinated product present in the insulating gas, to cause at least a portion of the liquid to vaporize.

18 Claims, 3 Drawing Sheets

(56) References Cited

U.S. PATENT DOCUMENTS

| | | | | |
|---|---|---|---|---|
| 3,406,269 | A * | 10/1968 | Fischer | H01H 33/22 218/85 |
| 3,985,987 | A * | 10/1976 | Patel | H01H 33/562 174/11 R |
| 4,698,468 | A * | 10/1987 | Pham | H01H 33/562 218/76 |
| 4,829,149 | A * | 5/1989 | Jeanjean | H01H 33/562 218/83 |
| 7,742,283 | B2 | 6/2010 | Hama et al. | |
| 7,923,630 | B2 * | 4/2011 | Richardson | H05K 5/06 174/15.1 |
| 2008/0135817 | A1 | 6/2008 | Luly et al. | |
| 2011/0309715 | A1 * | 12/2011 | Claessens | H01B 3/56 310/273 |
| 2012/0145521 | A1 | 6/2012 | Glasmacher | |
| 2012/0152904 | A1 | 6/2012 | Hyrenbach et al. | |
| 2013/0021555 | A1 | 1/2013 | Tateno et al. | |
| 2013/0215555 | A1 | 8/2013 | Kieffel et al. | |

FOREIGN PATENT DOCUMENTS

| | | |
|---|---|---|
| EP | 1 146 522 | 10/2001 |
| FR | 2 930 019 | 10/2009 |
| FR | 2 955 970 | 8/2011 |
| FR | 2 975 818 | 11/2012 |
| FR | 2 983 341 | 5/2013 |
| WO | 2010 142346 | 12/2010 |
| WO | 2010 142353 | 12/2010 |
| WO | 2012 038442 | 3/2012 |
| WO | 2012 038443 | 3/2012 |
| WO | 2012 160158 | 11/2012 |
| WO | 2013 004796 | 1/2013 |

OTHER PUBLICATIONS

International Search report Issued Aug. 28, 2012 in PCT/FR12/000167 Filed Apr. 27, 2012.

* cited by examiner

ELECTRICAL APPARATUS HAVING A GAS INSULATION CONTAINING A FLUORINATED COMPOUND

TECHNICAL FIELD

The invention relates to an electrical apparatus having a gas insulation for a medium- or high-voltage power transmission line, which contains means for regulating the quantity of insulating gas in suspension in the inner space of the insulating housing.

PRIOR ART

In an electrical apparatus for medium- or high-voltages, the functions of electrical insulation and electric arc extinction are typically performed by an insulating gas that is confined inside the apparatus. In the generally accepted sense of the term, "medium-voltage" denotes a voltage that is greater than 1,000 volts AC and strictly greater than 1,500 volts DC, but that does not exceed 52,000 volts AC or exceed 75,000 volts DC, whereas the term "high-voltage" denotes a voltage that is strictly greater than 52,000 volts AC and greater than 75,000 DC.

According to one known embodiment, the insulating gas used inside these apparatuses contains sulphur hexafluoride $SF_6$. Although it has very good properties, especially dielectric and chemical properties, sulphur hexafluoride is harmful to the environment; its GWP ("Global Warming Potential") in particular is very high.

Fluoroketones have been proposed as a replacement for sulphur hexafluoride, as described for example in the document WO 2010/142346. Fluoroketones have a good dielectric strength and better environmental characteristics than sulphur hexafluoride. Other fluorinated gases, used alone or in a mix, have also been envisioned due to their dielectric strength and their environmental characteristics, in particular hydrofluoroolefins (unpublished application FR 11 56062), hydrofluorocarbons, fluoro-oxiranes (unpublished application FR 11 60971), as well as hydrochloroolefins or hydrofluoroethers.

However, the boiling point of these fluorinated compounds is relatively high, especially as their molecule is large, particularly in the case of fluoroketone. Now, some electrical apparatuses are intended to be mounted outside, where the temperature may drop to negative temperatures as low as −40° C. Under such negative temperatures, it is possible to maintain the pressure of fluorinated gases, especially fluoroketones in gas form, only at a limited value, which reduces their effectiveness: in fact, at such temperatures, fluoroketone for example condenses, forming a liquid at the bottom of the housing.

The document WO2010/142346 describes an electrical apparatus containing means for regulating the pressure of fluoroketone gas. These regulating means contain means for injecting fluoroketone gas, and means for heating at least part of the outer housing of the apparatus; the partial heating of the housing makes it possible to heat the fluoroketone gas and to limit the condensation of the latter.

However, when the ambient temperature outside the housing is relatively cold, a large part of the heat produced to heat the housing is then exchanged with the outside, which translates into significant heat losses. Thus, such a system consumes a good deal of energy to heat the housing and the fluoroketone-based insulating gas.

SUMMARY OF THE INVENTION

The aim of the invention is to provide an electrical apparatus containing means for regulating the gas pressure of fluorinated gas while limiting losses of the produced heat.

The invention proposes an electrical apparatus having a gas insulation for medium- and/or high-voltages, containing a gas-tight housing the inner space of which is filled with an electrically insulating gas containing at least one fluorinated compound with a GWP below 3,500, notably a fluoroketone, a hydrofluoroolefin, a hydrofluorocarbon, and/or a fluorooxirane, or even a hydrochloroolefin or a hydrofluoroether. At least one electrical component is arranged in the inner space of the housing, which is made in such a way that a liquid formed by condensation inside the housing, and particularly from the fluorinated compound, is collected in a tank the inner space of which communicates with the inner space of the housing. The electrical apparatus also comprises means for regulating the quantity of fluorinated compound in the inner space of the housing, which regulating means contain means for heating a liquid resulting from the condensation of fluorinated compound present in the insulating gas.

The heating of the liquid formed by condensation causes it to vaporize and thus increases the gas pressure in the housing. Losses of the heat produced by the heating means are then limited, which improves the effectiveness of the means for regulating the pressure of the insulating gas.

For preference, the condensation liquid flows under gravity toward the tank, and the means for heating the liquid are arranged at least partly in the tank.

Notably, the heating means may contain a resistor making it possible to heat the inside of the tank; alternatively, the heating means contain a solenoid and a, preferably ferromagnetic, core making it possible to heat the inside of the tank.

In another embodiment, the heating means contain a heat conductor component that passes through the wall of the tank, part of the heat conductor being located outside the tank and another part of the heat conductor received inside the tank. For preference, said heat conductor consists in a tube enabling the inner space of the housing to be filled with insulating gas. The heat conductor is associated with means allowing its temperature to be modified, notably a resistor, respectively a solenoid and its associated core, arranged outside the tank and the housing, and which is capable of heating said part of the heat conductor which is located outside the tank; a part of the heat conductor, or of the tube, may be inside the means for modifying its temperature, notably inside the solenoid where suitable.

In another embodiment, the heating means are arranged in a cavity open toward the outside which protrudes upward in relation to a lower bottom wall of the tank. For preference, the inner space of the cavity is filled with a heat transfer fluid that is capable of conducting the heat produced by a resistor toward the wall of the cavity.

BRIEF DESCRIPTION OF THE DRAWINGS

Other features and advantages of the invention will become apparent on reading the following detailed description, the understanding of which will be assisted by referring to the appended figures, among which.

DETAILED DESCRIPTION OF PARTICULAR EMBODIMENTS

Figure 1:
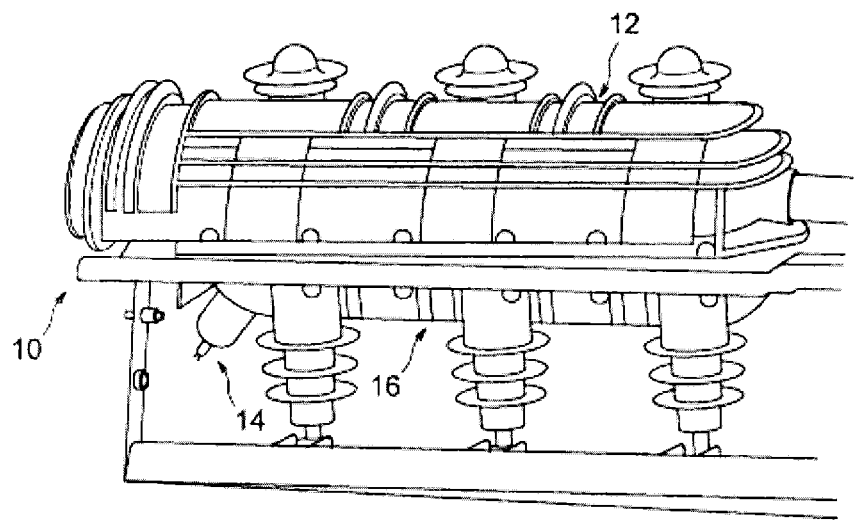
FIG. 1 is a schematic representation in perspective of an electrical apparatus containing regulating means according to the invention.

The electrical apparatus shown in FIG. 1 is a disconnector switch, allowing the switching on and off of a power transmission line with a medium- and/or high-voltage; other types of apparatus and/or geometry for disconnector switches may of course be considered for the invention.

The apparatus 10 in particular contains an outside housing 12 with a longitudinal main axis delimiting a hollow space in which an electrical component (not shown) is arranged. The inner space of the housing 10 is sealed in a gas-tight manner and is filled with an electrically insulating gas with a GWP of preferably less than 85%, or 95%, or even 99% of that of $SF_6$. In particular, the dielectric insulating gas comprises a fluorinated compound with a GWP of less than 3,500, alone or in a mix, chosen in order to have the best insulating qualities, while also having a high enough saturated vapor. In the detailed embodiment, the housing is filled with a gas comprising at least one fluoroketone, but alternatively, this could be a hydrofluoroolefin such as HFO 1234 zeE and HFO 1234 yf, or even HFO 1336 mzzzM, a hydrofluorocarbon such as HFC R-125 or HFC R-236cb, and/or a fluoro-oxirane such as $C_4F_8O$, as well as a hydrochloroolefin such as HCFO trans 1233zd or hydrofluoroethers such as HFE 245fa.

The performance of an insulating gas such as a fluoroketone is all the more important when its molecule is large, i.e. when it contains a large number of atoms of carbon and fluorine, and when the molecule is branched. On the other hand, the larger the fluoroketone molecule, the higher its boiling point, i.e. its saturated vapor pressure at a given temperature is low. For example, the boiling point of the molecule $C_5F_{10}O$ is about 22° C., the boiling point of the molecule $C_6F_{12}O$ is about 49° C. and the boiling point of the molecule $C_7F_{18}O$ is about 73° C. Consequently, at a given temperature, the insulating gas may contain a larger quantity of a fluoroketone having a small molecule than of a fluoroketone having a larger molecule, but the arc extinction capacity of this smaller molecule is poorer.

When the apparatus 10 is used outdoors, as a consequence of the relatively low ambient temperature, part of the fluorinated product present in the insulating gas condenses, then reducing its partial pressure in the insulating gas and then reducing the effectiveness of the gas insulation. To maintain the partial pressure of the fluorinated compound used at an adequate level, the apparatus 10 thus contains means for regulating the pressure of the insulating gas inside the housing 12, and in particular heating means to compensate for the condensation of fluoroketone and to maintain it in gaseous form.

According to the invention, the regulating means consist of means for recovering in a given place the liquid resulting from the condensation of the insulating gas, and for gathering it in a tank 14. In the following description, the term "condensate" will be used to define the liquid resulting from the condensation of the insulating gas.

Figure 2:
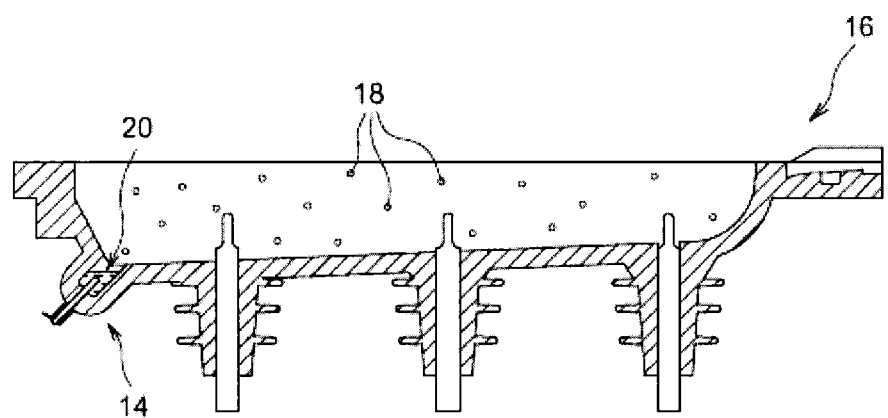
FIG. 2 is a section along a vertical longitudinal plane from the bottom of the housing in FIG. 1.

According to the preferred embodiment of the invention, the housing 12 of the apparatus 10 is made in such a way that the condensate flows under the Earth's gravity, and is recovered by a tank 14 toward which the condensate is caused to flow. In particular, in the embodiment in FIGS. 1 and 2, the bottom 16 of the housing 12 is concave and open toward the top; the lower surface of the bottom 16 is rounded and the bottom 16 is inclined with respect to the horizontal, in such a way that the condensate 18, which has flowed toward the bottom, also flows toward a longitudinal end of the bottom 16 of the housing 12. As a consequence, all the droplets of condensate 18 converge under gravity on a lower longitudinal end part of the bottom 16 of the housing.

The tank 14 according to the invention is arranged at the level of this longitudinal end of the bottom 16 so that the condensate 20 thus gathered drains into the tank 14. Thus, the tank 14 is located in a vertical position lower than the lowest point of the bottom 16 of the housing 12 and the tank 14 is open toward the top. The tank 14 is made in such a way that its inner space communicates directly with the inner space of the housing 12.

Figure 4:
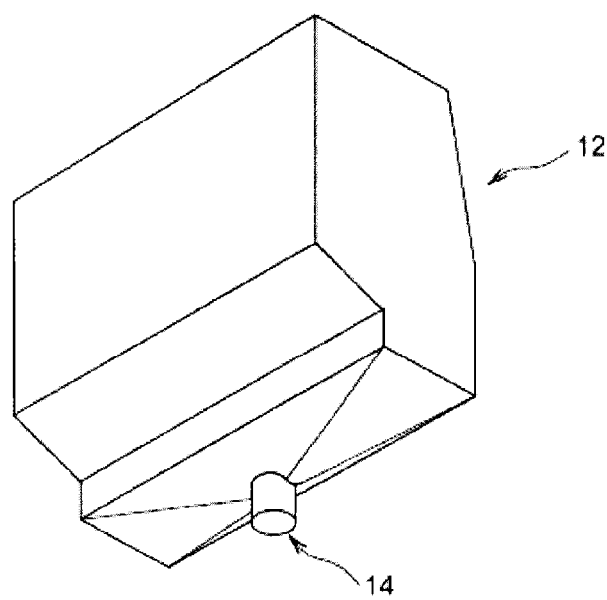
FIG. 4 is a schematic representation in perspective of another embodiment of the housing.

In FIG. 4 another embodiment of the housing 12 is shown in which all the walls are overall flat and inclined downward. The tank 14 is then located at the lower vertical end of the housing 12 and centered horizontally with respect to the housing 12. Thus, the walls of the housing 12 are all oriented in the direction of the tank 14 in such a way that the droplets 18 of condensed fluoroketone flow into the tank 14. Other alternatives are possible.

The housing 12 itself is made of a thermally insulating material, which makes it possible to limit the effects of outside weather conditions (FIG. 1). Alternatively, to reduce the total cost of the apparatus 10, the housing 12 may be made from a thermally conductive material, for example from metal (FIG. 4).

The electrical apparatus 10 also contains means for regulating the pressure of the insulating gas in the inner space of the housing 12. These regulating means contain means (not shown) for measuring the quantity of fluoroketone present in the inner space of the housing 12, which consist for example in at least one pressure sensor, means for measuring the density of fluoroketone or means for measuring the temperature of the insulating gas.

The regulating means also contain heating means making it possible to cause a vaporization of fluoroketone in the inner space of the housing 12. These heating means are controlled as a function of the quantity of fluoroketone measured by the measuring means defined above. The heating means are made in such a way as to heat only the condensate 20 which is recovered in the tank 14. Thus, the heating means trigger a vaporization of the condensate 20 collected in the tank 14, thus producing an increase in the quantity of fluoroketone in gas form present in the insulating gas.

Figure 3A:
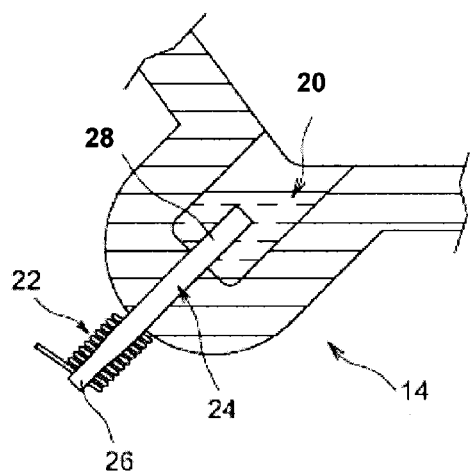
FIGS. 3A, 3B and 3C are larger-scale details of the tank shown in section in the FIG. 2, showing three embodiments of the heating means.

In a first embodiment illustrated in FIG. 3A, the heating means contain a resistor 22, for example an electrical resistor, which produces heat that is transmitted to the condensate; the heat produced by the resistor 22 is transmitted to the condensate by way of a heat conductor 24. This transmission of heat is particularly advantageous in the case where the housing 12 is made of thermally insulating material, because only the heat conductor 24 allows the heat produced by the resistor 22 to reach the condensate 20. It will nonetheless be understood that the heat conductor 24 may also be used for the embodiment in which the housing 12 is made from a thermally conductive material.

The resistor 22 is thus arranged outside the tank 14, preferably outside the housing 12, and the heat conductor 24 passes through the wall of the tank 14. A first end 26 of the heat conductor is located outside the housing 12 and is heated by the resistor, and a second end 28 of the heat conductor 24 is located inside the tank 14 and heats the condensate 20: the heat produced by the resistor is transmitted to the condensate 20 by way of the heat conductor 24.

The heat conductor 24 may be a tube used to fill the inner space of the housing 12 with insulating gas. This makes it possible to make a single aperture in the housing 12 in order to perform two functions, thus reducing the risks of gas leaks as well as the total cost of the apparatus 10.

Figure 3B:
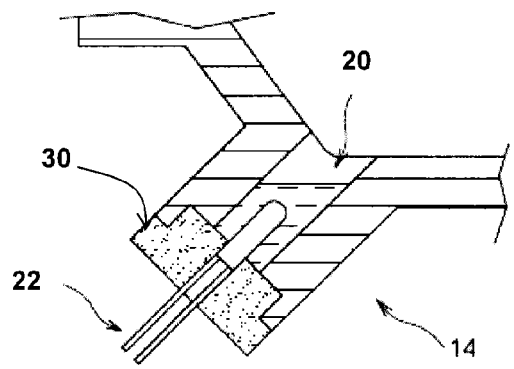

In a variant illustrated in FIG. 3B, the resistor 22 is received directly in the tank 14. It may also be noted that the tank 14 consists in a cylindrical element the lower axial end of which is sealed in an gas-tight manner by a cork 30 which carries the resistor.

Figure 3C:
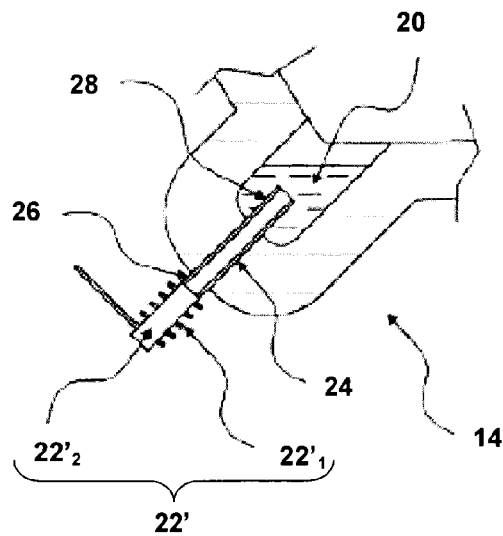

In a second embodiment shown in FIG. 3C, the heating means 22' comprise a solenoid $22'_1$ and its core $22'_2$. The heat produced is transmitted to the condensate 20, preferably by a way of a heat conductor 24, which may also be a filling tube: the solenoid $22'_1$ and its core $22'_2$ are thus arranged outside the tank 14, outside the housing 12, and the heat conductor 24 passes through the wall of the tank 14, a first end 26 of the heat conductor 24 being located outside the housing 12 and heated by the means 22', and the second end 28 located inside the tank 14 heating the condensate 20. Thus, the heat produced by the solenoid and its core is transmitted to the condensate 20 by way of the heat conductor 24.

Figure 5:
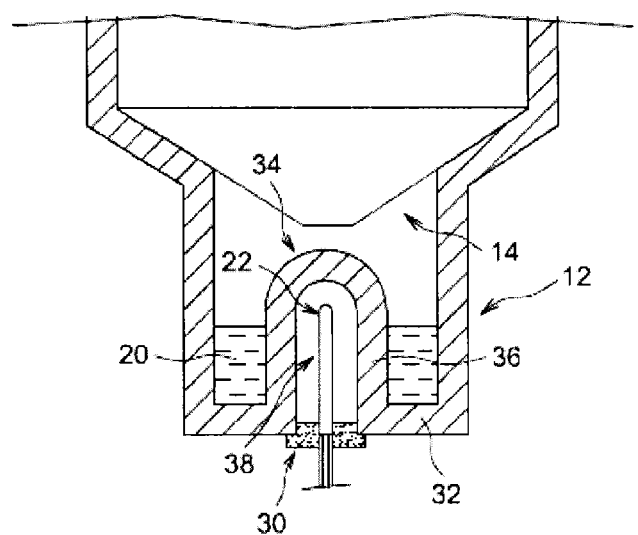
FIG. 5 is a section of the tank represented in FIG. 4, showing another embodiment of the heating means.

In another embodiment illustrated in FIG. 5, the tank 14 of condensate 20 contains a lower bottom wall 32 in which a cavity 34 is made. The cavity 34 protrudes vertically upwards with respect to the bottom wall 32: it therefore extends into the inside of the tank 14. The cavity 34 is open toward the bottom and is made in such a way that its inner space does not communicate with the inner space of the tank 14. A resistor 22 for heating the condensate 20 is arranged inside the cavity 34, remote from the walls 36 of the cavity 34. A cork 30 blocks the lower opening of the cavity 34 in a gas-tight manner, and carries the resistor 22. The space separating the resistor 22 from the walls 36 of the cavity 34 is filled by a heat transfer fluid 38 that transmits the heat produced by the resistor 22 to the walls 36 of the cavity.

This embodiment is particularly suited to a housing 12 the walls of which are made of a thermally conductive material. Thus, the walls of the tank 14 and the walls of the cavity 34 are also made of a thermally conductive material in order to conduct the heat, which is produced by the resistor 22, coming from the heat transfer fluid 38 toward the fluoroketone condensate 20. The heat thus transmitted toward the fluoroketone condensate 20 then vaporizes, to increase the pressure of the insulating gas.

By way of a variant embodiment, the means for heating the condensate 20 consist in means using magnetic and/or electric fields inside the electrical apparatus 10, which means makes it possible to have no external power source, the apparatus 10 is then autonomous as regards the heating of the condensate 20. Heat pipes or capillary evaporators could also be provided.

The electrical apparatus according to the invention is particularly advantageous due to the fact that a small proportion of the inner space of the housing 12 is heated by the heating means. These heating means therefore consume a small quantity of energy.

The invention claimed is:

1. An electrical apparatus having a gas insulation for medium- and/or high-voltages, comprising:
   a gas-tight housing including an inner space filled with an electrically insulating gas including at least one fluorinated compound with a global warming potential GWP below 3500;
   at least one electrical component arranged in the inner space of the housing;
   a regulator configured to regulate a quantity of the at least one fluorinated compound in the inner space of the housing; and
   a tank including an inner space directly communicating with the inner space of the housing, the inner space of the tank being seamlessly connected to the inner space of the housing, wherein
   a bottom of the housing is inclined with respect to a horizontal axis of the housing,
   a lower surface of the bottom is rounded,
   the tank is arranged at a longitudinal end of the bottom and located in a vertical position lower than a lowest point of the bottom,
   the housing and the tank are configured such that liquid formed by condensation of the fluorinated compound present in the insulating gas is collected in the tank, and
   the regulator includes a heater configured to heat the liquid resulting from condensation of the fluorinated compound present in the insulating gas, to cause vaporization of at least part of the liquid.

2. The electrical apparatus according to claim 1, wherein the heater is arranged at least partly inside the tank.

3. The electrical apparatus according to claim 2, wherein the heater includes a resistor configured to heat the inner space of the tank.

4. The electrical apparatus according to claim 2, wherein the heater includes a solenoid having a solenoid core configured to heat the inner space of the tank.

5. The electrical apparatus according to claim 2, wherein the heater includes a heat conducting component that passes through a wall of the tank, a first part of the heat conducting component being located outside the tank and a second part of the heat conducting component being located inside the tank.

6. The electrical apparatus according to claim 5, wherein the heater includes a resistor, arranged outside the tank and outside the housing, configured to heat the first part of the heat conducting component located outside the tank.

7. The electrical apparatus according to claim 5, wherein the heater includes a solenoid/core assembly, arranged outside the tank and outside the housing, configured to heat the first part of the heat conducting component located outside the tank.

8. The electrical apparatus according to claim 5, wherein the heat conducting component includes a tube allowing the inner space of the housing to be filled with the insulating gas.

9. The electrical apparatus according to claim 1,
   wherein the tank includes a lower bottom wall forming a cavity open toward the outside and that protrudes toward the inside of the tank, and
   wherein the heater is arranged in the cavity and includes at least a wall made from a conductive material.

10. The electrical apparatus according to claim 9, wherein the inner space of the cavity is filled with a heat-transfer fluid, the heater being remote from the wall of the cavity.

11. The electrical apparatus according to claim 10, wherein the heater includes a resistor or a solenoid/core assembly remote from the wall of the cavity, the heat transfer fluid being constituted so as to transfer heat produced toward the wall.

12. The electrical apparatus according to claim 1, wherein the fluorinated compound is chosen from fluoroketones, hydrofluoroolefins, fluorooxiranes, hydrofluorocarbons, or a mix of these compounds.

13. The electrical apparatus according to claim 1, wherein the housing is formed such that the liquid flows under gravity toward the tank.

14. The electrical apparatus according to claim 1, wherein the electrical apparatus is a disconnector switch configured to switch on and off a power transmission line associated with the at least one electrical component.

15. The electrical apparatus according to claim 1, wherein the housing has a bottom surface, at least a portion of the bottom surface of the housing being sloped toward an opening to the tank.

16. The electrical apparatus according to claim 1, wherein the tank is positioned only at a first end of the housing.

17. The electrical apparatus according to claim 1, wherein the heater is configured to heat only the condensate.

18. An electrical apparatus having a gas insulation for medium- and/or high-voltages, comprising:
- a gas-tight housing including an inner space filled with an electrically insulating gas including at least one fluorinated compound with a global warming potential GWP below 3500 chosen from fluoroketones, hydrofluoroolefins, fluorooxiranes, hydrofluorocarbons, or a mix of these compounds, and formed such that the liquid flows under gravity toward a tank;
- at least one electrical component arranged in the inner space of the housing;
- a regulator configured to regulate a quantity of fluorinated compound in the inner space of the housing; and
- the tank including an inner space communicating with the inner space of the housing, the inner space of the tank being seamlessly connected to the inner space of the housing, wherein
- a bottom of the housing is inclined with respect to a horizontal axis of the housing,
- a lower surface of the bottom is rounded,
- the tank is arranged at a longitudinal end of the bottom and located in a vertical position lower than a lowest point of the bottom,
- the housing and the tank are configured such that liquid formed by condensation of the fluorinated compound present in the insulating gas is collected in the tank, and
- the regulator includes a heater configured to heat the liquid resulting from condensation of the fluorinated compound present in the insulating gas, to cause vaporization of at least part of the liquid.

* * * * *